United States Patent
Botros

(10) Patent No.: US 7,071,259 B2
(45) Date of Patent: *Jul. 4, 2006

(54) FUNCTIONALIZED PROPYLENE POLYMER COMPOSITIONS AND COMPOSITES CONTAINING SAME

(75) Inventor: Maged G. Botros, West Chester, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/899,743

(22) Filed: Jul. 27, 2004

(65) Prior Publication Data

US 2006/0025526 A1    Feb. 2, 2006

(51) Int. Cl.
*C08L 51/00* (2006.01)

(52) U.S. Cl. .......................... 524/504; 525/57; 525/59; 525/66; 525/67; 525/70; 525/65; 525/86; 525/87

(58) Field of Classification Search ............. 524/504; 525/57, 59, 65, 66, 67, 70, 86, 87
See application file for complete search history.

(56) References Cited

U.S. PATENT DOCUMENTS

| | | | |
|---|---|---|---|
| 3,987,122 A * | 10/1976 | Bartz et al. ............. | 525/193 |
| 4,990,550 A | 2/1991 | Iwanami et al. | |
| 5,317,059 A | 5/1994 | Chundury et al. | |
| 5,324,755 A | 6/1994 | Kilius et al. | |
| 5,367,022 A | 11/1994 | Kiang et al. | |
| 5,473,015 A | 12/1995 | DeNicola, Jr. et al. | |
| 5,514,745 A | 5/1996 | Yoshino | |
| 5,665,820 A * | 9/1997 | Leistner et al. ......... | 525/66 |
| 5,883,188 A * | 3/1999 | Hwang et al. ........... | 525/71 |
| 6,270,883 B1 | 8/2001 | Sears et al. | |
| 6,716,928 B1 * | 4/2004 | Botros ................ | 525/285 |
| 6,894,115 B1 * | 5/2005 | Botros ................ | 525/101 |
| 2001/0033924 A1 | 10/2001 | Quian et al. | |

FOREIGN PATENT DOCUMENTS

WO    WO 97/33941    9/1997
WO    WO 02/059196 A1    8/2002

OTHER PUBLICATIONS

Botros, M., et al.: U.S. Appl. No. 10/816,389 filed Apr. 1, 2004: "Improved Multi-Phase Polypropylene Compositions.".

Ross, J.F., et al.: *Ind. Eng. Chem. Prod. Res. Dev.* 1988, 24: 149-154: "An Improved Gas-Phase Polypropylnee Process.".

\* cited by examiner

*Primary Examiner*—Jeffrey Mullis
(74) *Attorney, Agent, or Firm*—Gerald A. Baracka; William A. Heidrich

(57) ABSTRACT

Functionalized propylene polymer compositions useful as coupling/compatibilizing agents are provided. The compositions are a mixture of two different functionalized propylene polymers. Polypropylene composites containing fillers and/or non-compatible resins and formulated using the mixed functionalized coupling/compatibilizing agents are also provided.

17 Claims, No Drawings

FUNCTIONALIZED PROPYLENE POLYMER COMPOSITIONS AND COMPOSITES CONTAINING SAME

BACKGROUND OF THE INVENTION

1. Field of the Invention

The invention relates to functionalized propylene polymer compositions and, more specifically, compositions comprised of two different propylene polymers, both of which contain carboxylic acid or carboxylic acid derivative functionality. The mixed functionalized propylene polymer products of the invention are utilized as compatibilizing/coupling agents to facilitate incorporation of fillers and/or non-compatible resins into polypropylene base resins and provide composites having improved properties.

2. Description of the Prior Art

Multi-phase polypropylene (PP) composites are widely utilized for a variety of applications. For example, PP is commonly combined with non-compatible polymers, such as polyamides and ethylene-vinyl alcohol (EVOH) copolymers, to provide compositions suitable for films, coatings and moldings having improved barrier and physical properties. Similarly, PP and engineering thermoplastics are often blended to produce compositions and molded articles having improved mechanical properties. In other instances, various filler materials, such as mineral fillers, glass fibers and cellulosic fibers, are incorporated into PP to provide reinforced compositions having a desired balance of stiffness, impact strength, etc. For certain other applications, hydrated inorganic fillers are included in PP compositions to reduce flammability. In still other instances PP is combined with both a non-compatible polymer and filler material, e.g., nylons and glass fibers, to produce reinforced polymer composites.

It is accepted practice to include one or more functionalized compounds, commonly referred to as coupling agents and/or compatibilizing agents, to facilitate dispersion and/or bonding of the non-compatible polymers and/or filler materials with the non-polar PP polymer. It is generally believed that the functionalized compounds interact at the interface of the components to enhance compatibility of the additive component(s) and thus increase their desirable affect and provide composites having improved properties. Functionalized compounds commonly employed as coupling/compatibilizing agents include olefin polymers grafted with ethyleneically unsaturated carboxylic acids, hydrogenated vinyl aromatic/conjugated diene block copolymers grafted with ethylenically unsaturated carboxylic acids, olefin/acrylic ester/ethylenically unsaturated carboxylic acid terpolymers and olefin/acrylic ester/glycidyl acrylate terpolymers.

Functionalized propylene-ethylene copolymers have been disclosed as coupling/compatibilizing agents for wood fiber-filled PP compositions in published International Publication No. WO 02/059196 A1. The compositions contain 40–70 weight percent (wt. %) crystalline propylene polymer of specified tacticity and molecular weight distribution, 20–60 wt. % wood fiber and 0.3–12 wt. % functionalized olefin polymer. Whereas functionalized homopolymers of propylene are preferred, copolymers of propylene with another α-olefin, such as ethylene, are also mentioned.

Fiber-reinforced polymer composites containing 30–90 wt. % polyamide, 5–50 wt. % glass fibers and 10–70 wt. % polyolefin, of which a portion can be an unsaturated carboxylic acid-modified polyolefin, are disclosed in U.S. Pat. No. 4,990,550. The reference indicates that the polyolefins modified with unsaturated carboxylic acids or their derivatives are not limited to homopolymers of α-olefins but include copolymers of different α-olefins. Random and block copolymers of propylene and other α-olefins, most notably ethylene, wherein the propylene content is 50 mol % or more and, more preferably, 80 mol % or more are specifically mentioned.

Glass-filled polyolefin composites comprising propylene polymer of specified tacticity and MWD, ethylene/$C_{4-6}$ α-olefin plastomer and functionalized olefin polymer are disclosed in International Publication No. WO 97/33941. Grafted homopolymers and copolymers of propylene are disclosed. The reference also suggests that all or a portion of the impact modifier can be functionalized.

U.S. Pat. No. 5,514,745 discloses glass fiber reinforced molding compositions consisting of a PP resin and a long glass fiber reinforced PP masterbatch wherein glass fibers are surface-finished with a finishing agent containing a coupling agent which is impregnated with a modified PP having functionality capable of reacting with the coupling agent. Carboxylic acid and anhydride-modified PP resins are disclosed as useful modified PPs.

U.S. Pat. No. 5,324,755 discloses the use of polyethylene, polypropylene and copolymers of ethylene and propylene chemically modified with ethylenically unsaturated carboxylic acid or derivatives as coupling agents in compositions with propylene polymers grafted with styrenic monomer, glass fiber and, optionally, one or more rubber polymer components.

Published U.S. patent application US 2001/0033924 A1 discloses nanocomposite concentrate compositions comprised of a layered silicate material and a polyolefin matrix polymer. The polyolefin matrix polymer is comprised of maleic anhydride-modified polyolefin and unmodified polyolefin. The layered silicate is intercalated with the matrix polymer which can be in the form of a polymer or oligomer capable of polymerization to form the polymer. The reference indicates that impact copolymers containing ethylene-propylene rubber can be used as the matrix polymer and polymer intercalate for the invention.

Functionalized propylene-ethylene impact copolymers which are reactor-made intimate mixtures of propylene homopolymer and propylene-ethylene copolymer produced in gas-phase, stirred-bed, multi-stage polymerization processes are disclosed to be useful compatibilizing/coupling agents for propylene polymer composites in copending application Ser. No. 10/816,389.

Polyamide/olefin polymer blend compositions utilizing a plurality of compatibilizing agents are disclosed in U.S. Pat. No. 5,317,059. A first compatibilizing agent which is a terpolymer of an α-olefin, an acrylic ester and an alpha, beta-olefinically unsaturated dicarboxylic acid or glycidyl acrylate and auxiliary compatibilizing agent are employed. Ethylene-propylene elastomers grafted with maleic anhydride are mentioned as a type of auxiliary compatibilizing agent which can be used for the invention.

There is a continuing need for new functionalized compatibilizing/coupling agents suitable for use in the formulation of propylene polymer composites. It is particularly desirable when composites obtained using these functionalized materials have improved physical properties. These and other objectives are achieved with the mixed functionalized propylene polymer compositions of the invention.

SUMMARY OF THE INVENTION

The present invention relates to functionalized propylene polymer compositions useful as coupling/compatibilizing agents and to composites containing same. More specifically, the functionalized compositions of the invention are a mixture of two different functionalized propylene polymers comprising 5 to 95 weight percent, based on the weight of the composition, propylene-ethylene impact copolymer grafted with a carboxylic acid or carboxylic acid derivative and 95 to 5 weight percent, based on the weight of the composition, propylene homopolymer grafted with a carboxylic acid or carboxylic acid derivative. In a highly useful embodiment of the invention, the propylene-ethylene impact copolymer and propylene homopolymer are grafted with maleic anhydride. It is even more advantageous when the propylene-ethylene impact copolymer has from 1 to 3.5 wt. % maleic anhydride grafted and the propylene homopolymer has 0.75 to 1.5 wt. % maleic anhydride grafted.

Composites formulated using the mixed functionalized propylene polymer coupling/compatibilizing compositions contain 30 to 98.995 weight percent polypropylene base resin; 1 to 70 weight percent dispersed component selected from the group consisting of filler-type materials and polymers which are incompatible with said base resin; and 0.005 to 10 weight percent of the mixed functionalized propylene polymer composition. Propylene base resins used preferably have tacticity indexes greater than 94% and melt flow rates from 0.5 to 100 g/10 min. When the dispersed component is a polymer it is preferably a polymer selected from the group consisting of ethylene-vinyl alcohol copolymer, polyamide, polyester, polyvinylchloride, polyvinylidenedichloride, ethylene-carbon monoxide copolymer and terpolymer, polycarbonate, polyether, high impact polystyrene, styrene-acrylonitrile copolymer and acrylonitrile-butadiene-styrene terpolymer and when it is a filler-type material it is preferably selected from the group consisting of inorganic compounds, siliceous materials, cellulosic materials and nano-fillers. Polypropylene composites containing 2.5 to 60 wt. % nylon, glass fiber and fibrous cellulosic materials and 0.01 to 5 wt. % of the mixed functionalized propylene polymer coupling/compatibilizing composition of the invention are particularly advantageous.

DETAILED DESCRIPTION

The functionalized propylene polymer compositions of the invention useful as compatibilizing/coupling agents for the formulation of polypropylene composites are a mixture of two different functionalized propylene polymers. Functionalized propylene polymers, also referred to as modified propylene polymers, used for the invention are obtained by grafting propylene polymers with ethylenically unsaturated carboxylic acids or ethylenically unsaturated carboxylic acid derivatives, also referred to herein as the grafting monomer(s).

In accordance with the invention, two different grafted propylene polymers are combined to obtain the present compositions. The first functionalized component is a grafted propylene-ethylene impact copolymer and the second functionalized component is a grafted polypropylene i.e., propylene homopolymer. The first and second functionalized components may be grafted with the same or different grafting monomers and they may be produced using the same or different grafting procedures.

Useful grafting monomers which can be used to graft the propylene polymers include ethylenically unsaturated carboxylic acids or acid derivatives, such as an acid anhydrides, esters, salts or the like. Such monomers include but are not necessarily limited to the following: acrylic acid, methacrylic acid, maleic acid, fumaric acid, itaconic acid, citraconic acid, mesaconic acid, maleic anhydride, 4-methyl cyclohex-4-ene-1,2-dicarboxylic acid anhydride, bicyclo (2.2.2)oct-5-ene-2,3-dicarboxylic acid anhydride, 1,2,3,4,5,8,9,10-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleopimaric acid, tetrahydrophthhalic anhydride, norborn-5-ene-2,3-dicarboxylic acid anhydride, Nadic anhydride, methyl Nadic anhydride, Himic anhydride, methyl Himic anhydride, and x-methylbicyclo(2.2.1)hept-5-ene-2,3-dicarboxylic acid anhydride (XMNA). Maleic anhydride is a particularly useful grafting monomer and it is especially advantageous when both the first and second functionalized components are grafted with maleic anhydride.

The first and second functionalized propylene polymers are produced using conventional grafting procedures. In a highly useful embodiment of the invention, the first and second functionalized components are grafted by melt-blending the polymer and grafting monomer with a free radical generating catalyst, such as a peroxide, in the substantial absence of solvent using a shear-imparting reactor, such as an extruder/reactor. Twin screw extruder/reactors such as those marketed by Coperion (formerly Werner-Pfleiderer) under the designations ZSK-53, ZSK-83 and ZSK-90 are commonly used for these processes.

For such processes the peroxide catalyst can be introduced into the molten propylene polymer before or after introduction of the grafting monomer. Since substantial amounts of solvent are to be avoided, the catalyst and grafting monomer are preferably added in neat form to the reactor. The monomer typically constitutes about 1 to about 5 wt. % of the reaction mixture. A temperature profile wherein the temperature is gradually increased over the length of the extruder/reactor up to a maximum in the grafting reaction zone and then decreases toward the reactor exit is preferred. Temperature attenuation is desirable for pelletizing purposes. The maximum temperature within the reactor should be such that significant vaporization losses and/or premature decomposition of peroxide catalyst is avoided. For example, with di-t-butyl peroxide and 2,5-dimethyl-2,5-di-(t-butylperoxy) hexane, maximum temperatures within the reactor should be maintained at or below about 260° C. In contrast, the so-called "thermal" grafting processes of the prior art which do not include catalysts, may use temperatures up to about 380° C. The maximum useful temperature varies with the selection of catalyst. Examples of useful peroxide catalysts include: 1,1-bis(tert-butylperoxy)cyclohexane; n-butyl-4,4-bis(tert-butylperoxyvalerate); 1,1-bis(tert-butylperoxy)-3,3,5-trimethylcyclohexane; 2,2-bis(tert-butylperoxy)butane; dicumylperoxide; tert-butyl-cumylperoxide; α,α'-bis(tert-butylperoxypreoxy-isopropyl)benzene; di-tert-butylperoxide (DTBP); 2,5-dimethyl-2,5-di (tert-butylperoxy) hexane; and the like. Additional details regarding the grafting procedure and reactor extruder are provided in U.S. Pat. No. 5,367,022 which is incorporated herein by reference.

The first functionalized propylene polymer component, obtained in accordance with the above-described grafting procedures, is a propylene-ethylene impact copolymer comprised of crystalline (propylene homopolymer) and amorphous or rubber (ethylene-propylene copolymer) phases. Ethylene contents of the impact copolymers generally range from about 5 to about 30 wt. % and, more preferably, from 6 to 25 wt. %. Thermoplastic polyolefins (TPOs) and thermoplastic elastomers (TPEs) are also encompassed within the above definition.

In a highly useful embodiment of the invention the propylene-ethylene impact copolymer from which the first functionalized component is derived is a reactor-made intimate mixture of propylene homopolymer and ethylene-propylene copolymer produced in a gas-phase, stirred-bed, multi-stage polymerization process. Most typically they are produced in two reactors connected in series using high activity supported transition metal catalysts. Propylene homopolymer is produced in the first reactor and then introduced to the second reactor where additional propylene, ethylene, hydrogen and catalyst, as necessary, are metered to produce the intimate physical mixtures which comprise the propylene-ethylene impact copolymers utilized for the invention. Gas phase polymerizations of this type are described in the article by Ross, et al., entitled "An Improved Gas-Phase Polypropylene Process" in *Ind. Eng. Chem. Prod. Res. Dev.* 1985, 24, 149–154, which is incorporated herein by reference.

In another highly advantageous embodiment of the invention the propylene-ethylene impact copolymer has a high graft to melt flow rate (MFR) ratio. MFRs referred to herein are determined in accordance with ASTM D 1238, Condition L (2.16 kg load at 230° C.). Functionalized propylene-ethylene impact copolymers having high graft monomer contents and relatively low MFRs which are especially useful for the compositions of the invention are obtained when high rubber content, narrow molecular weight distribution (MWD) impact copolymers are grafted with maleic anhydride. More specifically, these impact copolymers have rubber contents of 20% or more and MWDs of 7 or below. It is even more preferable when the propylene-ethylene impact copolymers have rubber contents of 25% or more and MWDs of 6 or below. By using high rubber content, narrow MWD propylene-ethylene impact copolymers, it is possible to produce functionalized products having graft to MFR ratios of 0.5 or higher. Graft to MFR ratios are determined in accordance with the formula (weight percent monomer grafted÷MFR)×100.

For example, a grafted product having 2% maleic anhydride grafted and MFR of 20 would have a ratio of 10. As used herein, the terms graft, grafted and grafting denote covalent bonding of the monomer to the copolymer chain. Grafted propylene-ethylene impact copolymers having graft to MFR ratios of 1 and above are disclosed in U.S. Pat. No. 6,716,928 which is incorporated herein by reference.

The first functionalized component is grafted with 1 to 3.5 wt. % carboxylic acid or carboxylic acid derivative and, more preferably, will contain 1.5 to 2.8 wt. % of the graft monomer. The grafted propylene-ethylene impact copolymer comprises 5 to 95 wt. % and, more preferably, 25 to 75 wt. % of the mixed functionalized propylene polymer composition. Weight percentages provided for the first and second functionalized components herein are based on the total weight of the composition.

A second functionalized component is combined with the functionalized first component and makes up the balance of the composition. The second functionalized component in the mixture is a propylene homopolymer grafted in accordance with the previously described procedures and comprises from 95 to 5 wt. % and, more preferably, 75 to 25 wt. % of the mixed functionalized composition. The functionalized polypropylene component is grafted with 0.75 to 1.5 wt. % carboxylic acid or carboxylic acid derivative. It is especially advantageous when the second functionalized component contains 0.8 to 1.25 wt. % graft monomer. Propylene homopolymers used to obtain the second graft-functionalized component can be any of the known highly crystalline isotactic polypropylene resins having tacticity indexes of 90% or above and, more typically, greater than 94%.

Mixed functionalized compositions obtained by combining first and second functionalized components of the above types are advantageously employed as coupling/compatibilizing agents for the preparation of polypropylene composites. When used herein the term "composite(s)" refers to polypropylene compositions containing one or more components, e.g., filler materials and/or polymers, which are incompatible or not readily compatible with the polypropylene. These filler materials and incompatible polymers are referred to herein as the dispersed component(s) and the polypropylene is referred to as the base resin.

Polypropylene base resins utilized for the composites are any of the known highly crystalline isotactic propylene homopolymers having tacticity indexes greater than 90% and, more preferably, greater than 94%. The base resins typically have MFRs from about 0.5 up to about 100 g/10 min. and, more preferably, in the range 2 to 50 g/10 min.

Filler-type materials commonly used for the composites can include inorganic and organic materials commonly used as reinforcing materials. These include both naturally derived and synthetically produced materials selected from the group consisting of inorganic compounds, siliceous materials, cellulosic materials and nanofillers.

Useful inorganic and siliceous materials can include hydrated aluminum oxides, hydrated magnesia, calcium carbonate, hydrated calcium silicate, zinc borate, magnesium silicate and hydrated magnesium silicate, silica gel, fumed silica, talc, quartz, mica, clays such as bentonite, montmorillonite, attapulgite, wollastonite, kaolinite, etc., glass fiber and the like.

Useful nanofillers can include any of the known filler materials having a particle size in the nanometer range including $SiO_2$, SiC (nanowhiskers), carbon nanotubes and nanoclays.

Useful glass fibers employed to produce useful PP composites include those produced as yarns, rovings, chopped strands, etc. Glass fiber reinforcing agents produced as chopped strands can range in length from about ⅛ to about 1 inch and, more preferably, from 3/16 to ½ inch with diameters from about 5 to 20 micrometers (μm). Composites produced using long and/or continuous fibers by processes such as pulltrusion, pushtrusion or extrusion also benefit from use of the mixed functionalized compositions of the invention. Technologies wherein long and/or continuous length fibers are fed during the molding operation are widely employed for traditional and specialty composite applications.

The glass fibers may be surface treated with various sizing agents, most commonly, silane compounds and other functional monomers. Commonly used silane sizing agents include vinyltrichlorosilane, vinyltris(beta-methoxyethoxy)silane, vinyltriethoxysilane, gamma-methacryloxypropyl-trimethoxysilane, beta-(3,4-epoxycyclohexyl)ethyltrimetoxysilane, gamma-glycidoxy-propyltrimetoxysilane, N-(beta-aminoethyl)-gamma-aminopropyl-methyldimethoxysilane, gamma-aminopropyltriethoxysilane, N-phenyl-gamma-aminopropyltrimethoxysilane, gamma-chloropropyltrimethoxysilane and the like.

Whereas glass fibers are extensively used as reinforcing agents for thermosets and thermoplastics to provide composites having high stiffness, high strength, dimensional stability and heat resistance, they do have the disadvantage of being significantly heavier than cellulosic fibers. Also, glass fibers can abrade processing equipment. For this reason, cellulosic fiber reinforced composites are increasingly being used for automotive molding applications and building/structural applications where lightweighting is an important consideration.

Cellulosic materials used for composites are obtained from a variety of natural sources. Fibers derived from sugar cane, pulp, hemp, kenaf, flax, jute, sisal and the like can be used, as may pulverized peanut shells, cherry pit flour and the like. Wood fiber, e.g., wood flour, is also useful and is available from a variety of sources. Cellulose pulps and particularly those having an α-cellulose purity greater than 80% are a highly useful class of reinforcing agents. Such cellulosic fiber materials are described in detail in U.S. Pat. No. 6,270,883 which is incorporated herein by reference.

In addition to being advantageously employed with composites containing filler-type materials of the above types, the mixed functionalized compositions of the invention are also highly effective when incorporating non-compatible polymers into polypropylene base resins. Polymeric dispersed components of this type are typically polymers having sufficient polarity so that they are not readily miscible with the non-polar polypropylene base resin during melt-blending. Such resins include ethylene-vinyl alcohol (EVOH) copolymers, polyamides (PA), polyesters such as polyethylene terephthalates (PET), polyvinylchloride (PVC), polyvinylidenedichlorides (PVDC), ethylene-carbon monoxide (ECO) copolymers and terpolymers, polycarbonates, polyethers such as polyphenyleneoxide (PPO) or polyacetal, high impact polystyrene (HIPS), styrene-acrylonitrile (SAN), acrylonitrile-butadiene-styrene (ABS), and the like.

In one highly useful embodiment, the mixed functionalized compositions of the invention are employed to facilitate incorporation of polyamides into the PP base resin. Any of the known polyamides obtained by the condensation of $C_{4-12}$ dicarboxylic acids with $C_{4-16}$ diamines or by ring-opening polymerization of cyclic lactams can be used; however, use of the mixed functionalized compositions is most advantageous for the production of polypropylene composites containing polytetramethylene adipamide (nylon 4,6), polyhexamethylene adipamide (nylon 6,6), polyhexamethylene azelamide (nylon 6,9), polyhexamethylene sebacamide (nylon 6,10), polyhexamethylene dodecanoamide (nylon 6,12), polycaprolactam (nylon 6), polybutyrolactam, polypivalolactam and poly-11-aminoundecanoic acid.

Composites having improved physical properties obtained using the mixed functionalized compositions of the invention are comprised of 30 to 98.995 wt. % polypropylene base resin, 1 to 70 wt. % non-compatible polymer and/or filler and 0.005 to 10 wt. % of the mixed functionalized compatibilizing/coupling agent. The composites may contain other additives known to the art to improve processability, stability and appearance. Such additives include foaming agents, thermal and oxidation stabilizers, plasticizers, ultraviolet light stabilizers, lubricants, mold release agents, flame retardants, colorants, dyes, pigments and the like.

The primary components, i.e., base resin, dispersed component and mixed functionalized coupling/compatibilizing agent, and such other additives as may be used, can be melt-blended and extruded in accordance with known and generally accepted practices using conventional equipment commonly employed in the resin compounding arts. Mixers capable of imparting high shear, such as Banbury mixers, twin-screw extruders or the like can be used to accomplish the melt-blending. The compositions can be fabricated by melt extrusion, injection or compression molding or the like to produce the finished composite product.

A useful technique when preparing the composites, especially when very low levels of the mixed functionalized composition are to be incorporated, is to prepare a masterbatch or concentrate of the mixed functionalized composition and base resin or another readily processable polyolefin resin and then to "let down" the concentrate into the polypropylene base resin and filler and/or non-compatible resin during the melt-blending operation.

In a highly useful embodiment of the invention, composites produced using the mixed functionalized compatibilizing/coupling compositions of the invention preferably contain 50 to 97.49 wt. % polypropylene base resin, 2.5 to 60 wt. % non-compatible polymer and/or filler and 0.01 to 5 wt. % of the mixed functionalized compatibilizing/coupling agent. It is even more advantageous when the mixed functionalized compatibilizing/coupling agent is present from 0.01 to 2 wt. %. In one highly useful embodiment where the composites contain glass fiber reinforcing materials, the composite will contain 5 to 50% and, more preferably, 10 to 40% of the dispersed component. In another highly useful embodiment where the dispersed component is a cellulosic material, the cellulosic component will constitute 40 to 70% and, more preferably, 50 to 60% of the composite. In yet another preferred embodiment where the dispersed component is a nylon or polyester polymer, the dispersed component is present in an amount from 1 to 30% and, more preferably, from 5 to 20%.

The following examples illustrate the invention; however, those skilled in the art will recognize many variations that are within the spirit of the invention and scope of the claims.

EXAMPLE I

A. Preparation of the First Functionalized Propylene Polymer Component:

A maleic anhydride grafted propylene-ethylene impact copolymer having a high graft monomer content and relatively low MFR was prepared in accordance with the general procedure described in U.S. Pat. No. 6,716,928. The propylene-ethylene impact copolymer used for the grafting operation contained 14.8 wt. % ethylene and had an MFR of 1 g/10 min. The impact copolymer was comprised of a crystalline phase (isotactic polypropylene homopolymer) and a rubbery phase (EPR). The impact copolymer contained approximately 30 wt. % ethylene-propylene copolymer (EPR) and the MWD (Mw/Mn) was 5.

Grafting was carried out using maleic anhydride in a Werner-Pfleiderer Model ZSK-90 twin-screw extruder/reactor having multiple zones with screen changer, die plate and polymer pellet feed and reactant supply metering equipment. The reactor/extruder was connected to a strand pelletizer. Temperatures in the heating/mixing zones ranged from 176° C. up to a maximum of 222° C. Temperature in the final heating/mixing stages and at the extruder die plate was 200° C. Screw speed was maintained at 300 rpm and reactor throughput was approximately 1000 lb/hr. Feed rates were controlled to achieve the desired graft levels. Maleic anhydride was charged to the extruder/reactor at a 4 wt. % level, based on the impact copolymer feed rate. Organic peroxide (2,5-dimethyl-2,5-di(t-butylperoxy)hexane) was charged at a 0.7 wt. % level, based on the impact copolymer feed rate. The amount of maleic anhydride grafted was 2.17% (determined by FTIR) and the MFR was 350 g/10 min. The graft to MFR ratio of the grafted impact copolymer calculated based on the above values was 0.62.

B. Preparation of the Second Functionalized Propylene Polymer Component:

Maleic anhydride grafted propylene homopolymer was obtained using the same general procedure employed for the impact copolymer. The polypropylene used had a tacticity index of greater than 99% and MFR of 0.9 g/10 min.

Grafting was carried out using a Werner-Pfleiderer Model ZSK-90 twin-screw extruder/reactor having multiple zones with screen changer, die plate and polymer pellet feed and reactant supply metering equipment. The reactor/extruder was connected to a strand pelletizer. Temperatures in the heating/mixing zones ranged from 160° C. up to a maximum of 196° C. Temperature in the final heating/mixing stages and at the extruder die plate was 171° C. Screw speed was maintained at 300 rpm and reactor throughput was approximately 1000 lb/hr. Maleic anhydride was charged to the extruder/reactor at a 4 wt. % level, based on the polypropylene feed rate. LUPEROX 101 (2,5-dimethyl-2,5-di(t-butylperoxy)hexane) was charged at a 0.75 wt. % level, based on the polypropylene homopolymer feed rate. The amount of maleic anhydride grafted was 1.2 wt. % as determined by titration. The MFR of the grafted polypropylene homopolymer was 750 g/10 min.

C. Preparation of Functionalized Propylene Polymer Concentrates:

To facilitate formulation of composites produced using the mixed functionalized propylene polymer compositions of the invention, concentrates of the first functionalized component (IA) and the second functionalized component (IB) were prepared.

The concentrates were prepared by melt-blending the functionalized material (IA or IB) with a polypropylene blending resin having an MFR of 5 g/10 min. Melt-blending was accomplished using a 30 mm twin screw extruder with co-rotating intermeshing screws and eight heating zones. Temperatures within the extruder barrel increased from about 200° C. in the first heating zone up to a maximum of 255° C. in the final heating zone. The extruder was equipped with a heated die maintained at 227° C. Screw speed was 240 rpm and throughput was 49.4 lbs/hour. The ratio of the graft component to blending resin used was calculated so that the concentration of maleic anhydride in the concentrate was 0.88 wt. %. Thus, for concentrate IA, 40.6 wt. % of the functionalized component was combined with 59.4 wt. % PP blending resin and for concentrate IB, 73 wt. % of the functionalized component was combined with 27 wt. % PP blending resin.

A concentrate of the mixed functionalized compositions of the invention was prepared by combining equal parts of Concentrates IA and IB and melt-blending using the same equipment and conditions described above. This concentrate, identified as concentrate IC, was employed for preparation of the composites of the invention described in Examples II, III and IV which follow. Concentrate IA was employed for the comparative composites described in Comparative Examples A and C and Concentrate IB was used for Comparative Examples B and D.

EXAMPLE II

To demonstrate the utility of the mixed functionalized propylene polymer compositions of the invention and the improvement achieved therewith, a polypropylene/nylon-6 composite was prepared using Concentrate IC. The PP base resin used was a 5 MFR propylene homopolymer (>99% tacticity) which contained 4500 ppm stabilizer. The composite contained 88 wt. % base resin, 10 wt. % nylon-6 and 2 wt. % of Concentrate IC, i.e., the 50/50 blend of components IA and IB. The composite was prepared by melt-blending all of the components using the same equipment and conditions described above for preparation of the concentrates. Test specimens were molded from the composite composition using a Battenfeld 230E injection molder in accordance with ASTM D 648-00 and evaluated for flexural strength at 5% strain in accordance with ASTM D 790-00, Young's modulus in accordance with ASTM 638-00, elongation at break in accordance with ASTM D 638-00 and tensile toughness in accordance with ASTM D 638-00. Test results are tabulated in Table 1.

COMPARATIVE EXAMPLE A

A polypropylene/nylon-6 composite was prepared and evaluated as described in Example II. The composite was the same as that of Example II except that the mixed functionalized compatibilizing agent was replaced by the compatibilizing agent comprised solely of the first functionalized component. For formulation of this comparative composite, 2 wt. % of Concentrate IA was melt-blended with the PP base resin (88 wt. %) and nylon-6 (10 wt. %). Identically prepared test specimens were evaluated and test results are set forth in Table 1.

COMPARATIVE EXAMPLE B

Comparative Example A was repeated except that Concentrate IB was used at a 2 wt. % level in the PP/nylon composite. In other words, the compatibilizing agent used for this comparative composite was comprised solely of the second functionalized component. Test results obtained for the comparative composite prepared in this manner are set forth in Table 1.

TABLE 1

| | Flexural Strength (PSI) | Young's Modulus (PSI) | Elongation at Break (%) | Tensile Toughness (PSI) |
| --- | --- | --- | --- | --- |
| Example II | 7400 | 376,000 | 142 | 4740 |
| Comparative Example A | 7060 | 354,000 | 140 | 4700 |
| Comparative Example B | 7080 | 351,000 | 53 | 2352 |

It is apparent from the data presented in Table 1 that the composite formulated using the mixed functionalized composition of the invention, i.e., Concentrate IC, exhibited consistently improved physical properties compared to the composites prepared using either the first functionalized component by itself or the second functionalized component by itself. Unexpectedly, a significant increase in flexural strength and Young's modulus was obtained using the composition comprised of a mixture of the first and second functionalized components compared to the use of either component by itself.

EXAMPLE III

To demonstrate the significant improvement in impact properties obtainable with composites formulated using the compositions of the invention, Example II was repeated except that the nylon-6 level was increased. The composite contained 65 wt. % polypropylene, 30 wt. % nylon-6 and 5 wt. % Concentrate IC containing a mixture of the two different functionalized polypropylene polymers. Molded test specimens prepared from the composite material were evaluated for Izod impact at −18° C. (un-notched) in accordance with ASTM D 256-00. The impact strength was 8.33 ft-lb/in as compared to a value of only 3.62 ft-lb/in for a comparative composite prepared using 5 wt. % of Concentrate IB, i.e., the maleic anhydride grafted polypropylene component, by itself. The impact strength of the composite formulated in accordance with the invention was also significantly higher than the 7.63 ft-lb/in obtained for a comparative composite prepared using only the maleic anhydride grafted impact copolymer, i.e., Concentrate IA, at the same level.

EXAMPLE IV

To demonstrate the advantages obtained with talc-filled composites prepared using the mixed functionalized compositions of the invention, a composite was prepared comprised of 68 wt. % polypropylene (12 MFR), 30 wt. % talc (average particle size 10 microns) and 2 wt. % concentrate IC containing a mixture of the first and second functionalized propylene polymers. Mixing and sample preparation procedures were the same as described in Example II. Comparative talc-filled composites, identified as Comparative C and Comparative D, were identically prepared except that Concentrate IC was replaced with 2 wt. % Concentrate IA for Comparative C and 2 wt. % Concentrate IB for Comparative D. Test results which demonstrate the marked and unexpected improvement achieved when the compatibilizing/coupling agent is a mixture of grafted impact copolymer and grafted propylene homopolymer are set forth in Table 2. Flexural strength at break and flexural modulus were determined in accordance with ASTM D 790-00 and Dynatup impact was determined in accordance with ASTM D 3763.

TABLE 2

|  | Flexural Strength at Break (PSI) | Fluxural Modulus (PSI) | Dynatup Impact @-18° C. (ft-lb/in) |
|---|---|---|---|
| Example IV | 9684 | 552,900 | 2.53 |
| Comparative C | 9590 | 520,500 | 2.15 |
| Comparative D | 9560 | 510,000 | 2.01 |

I claim:

1. A composite comprising:
   (i) 30 to 98.995 weight percent polypropylene base resin;
   (ii) 1 to 70 weight percent dispersed component which is a polymer incompatible with said polypropylene base resin selected from the group consisting of ethylene-vinyl alcohol copolymer, polyamide, polyester, polyvinylchloride, polyvinylidenedichloride, ethylene-carbon monoxide copolymer and terpolymer, polycarbonate, polyether, high impact polystyrene, styrene-acrylonitrile copolymer and acrylonitrile-butadiene-styrene terpolymer; and
   (iii) 0.005 to 10 weight percent functionalized propylene polymer composition comprising (a) 5 to 95 weight percent, based on the weight of the functionalized composition, propylene-ethylene impact copolymer grafted with maleic anhydride and having a graft to melt flow rate ratio of 0.5 or above, said impact copolymer being a reactor-made intimate mixture of propylene homopolymer and ethylene-propylene copolymer rubber produced in a gas-phase, stirred-bed, multi-stage polymerization process, and (b) 95 to 5 weight percent, based on the weight of the functionalized composition, propylene homopolymer grafted with maleic anhydride.

2. The composite of claim 1 wherein the base resin is a highly crystalline propylene homopolymer having a tacticity index greater than 94% and melt flow rate from 0.5 to 100 g/10 min.

3. The composite of claim 2 wherein the dispersed component is a polyamide selected from the group consisting of polytetramethylene adipamide, polyhexamethylene adipamide, polyhexamethylene azelamide, polyhexamethylene sebacamide, polyhexamethylene dodecanoamide, polycaprolactam, polybutyrolactam, polypivalolactam and poly-11-aminoundecanoic acid.

4. The composite of claim 2 wherein (a) has a molecular weight distribution of 7 or less and contains 20 weight percent or more ethylene-propylene copolymer and is grafted with from 1 to 3.5 weight percent maleic anhydride and (b) is grafted with from 0.75 to 1.5 weight percent maleic anhydride.

5. The composite of claim 4 comprising 50 to 97.49 weight percent polypropylene base resin, 2.5 to 60 weight percent dispersed component and 0.01 to 5 weight percent functionalized propylene polymer composition.

6. The composite of claim 5 wherein the functionalized propylene polymer composition is comprised of 25 to 75 weight percent (a) and 75 to 25 weight percent (b).

7. The composite of claim 6 wherein (a) is grafted with 1.5 to 2.8 weight percent maleic anhydride and the propylene-ethylene impact copolymer has an ethylene content from 5 to 30 weight percent.

8. The composite of claim 7 wherein (b) is grafted with 0.8 to 1.25 weight percent maleic anhydride.

9. A composite comprising:
   (i) 30 to 98.995 weight percent polypropylene base resin;
   (ii) 1 to 70 weight percent dispersed component which is a filler material selected from the group consisting of inorganic compounds, siliceous materials, cellulosic materials and nanofillers; and
   (iii) 0.005 to 10 weight percent functionalized propylene polymer composition comprising (a) 5 to 95 weight percent, based on the weight of the functionalized composition, propylene-ethylene impact copolymer grafted with maleic anhydride and having a graft to melt flow rate ratio of 0.5 or above, said impact copolymer being a reactor-made intimate mixture of propylene homopolymer and ethylene-propylene copolymer rubber produced in a gas-phase, stirred-bed, multi-stage polymerization process and (b) 95 to 5 weight percent, based on the weight of the functionalized composition, propylene homopolymer grafted with maleic anhydride.

10. The composite of claim 9 wherein the base resin is a highly crystalline propylene homopolymer having a tacticity index greater than 94% and melt flow rate from 0.5 to 100 g/10 min.

11. The composite of claim 10 wherein the dispersed component is glass fiber.

12. The composite of claim 10 wherein the dispersed component is a fibrous cellulosic material derived from natural sources.

13. The composite of claim 10 wherein (a) has a molecular weight distribution of 7 or less and contains 20 weight percent or more ethylene-propylene copolymer and is grafted with from 1 to 3.5 weight percent maleic anhydride and (b) is grafted with from 0.75 to 1.5 weight percent maleic anhydride.

14. The composite of claim 13 comprising 50 to 97.49 weight percent polypropylene base resin, 2.5 to 60 weight percent dispersed component and 0.01 to 5 weight percent functionalized propylene polymer composition.

15. The composite of claim 14 wherein the functionalized propylene polymer composition is comprised of 25 to 75 weight percent (a) and 75 to 25 weight percent (b).

16. The composite of claim 15 wherein (a) is grafted with 1.5 to 2.8 weight percent maleic anhydride and the propylene-ethylene impact copolymer has an ethylene content from 5 to 30 weight percent.

17. The composite of claim 16 wherein (b) is grafted with 0.8 to 1.25 weight percent maleic anhydride.

* * * * *